United States Patent [19]

Nattel

[11] Patent Number: 5,744,753
[45] Date of Patent: Apr. 28, 1998

[54] ELECTRICAL OUTLET BOX

[75] Inventor: William Nattel, Montreal, Canada

[73] Assignee: Thomas & Betts Corporation, Memphis, Tenn.

[21] Appl. No.: 490,802

[22] Filed: Jun. 15, 1995

[51] Int. Cl.$^6$ .................................................. H02G 3/08
[52] U.S. Cl. ........................ 174/58; 220/3.2; 220/3.3; 220/3.5
[58] Field of Search .................... 174/50, 48, 58; 220/241, 242, 3.2, 3.3, 3.5, 3.92, 3.94, 4.02

[56] References Cited

U.S. PATENT DOCUMENTS

| 4,032,030 | 6/1977 | Bass et al. | 220/3.8 |
| 4,202,457 | 5/1980 | Tansi | 220/3.3 |
| 4,842,156 | 6/1989 | Nattel | 220/3.9 |

*Primary Examiner*—Kristine L. Kincaid
*Assistant Examiner*—Joseph Waks
*Attorney, Agent, or Firm*—Hoffmann & Baron, LLP

[57] ABSTRACT

An electrical outlet box is formed from side plates and an U-shaped plate forming top, bottom and rear walls. The side plate has bosses, projecting outwardly from the box to ensure that the box is uniformly spaced from a vertical surface, for example the side of a stud. To facilitate mounting of the box to a stud, at least one boss has an aperture therein for receiving a screw or other fastener. Preferably, this aperture has an axis angled so that the axis passes through the front opening of a box. The bosses with apertures can include planar central portions for receiving a screw head and further can have an outer portion to the aperture for receiving part of a screw head to minimize protrusion of the screw head into the box. The screw head is then recessed away from the interior of the box to prevent shorting of electrical context, and as it is located in a boss contacting the stud or other surface, unwanted distortion of the side plate is avoided.

29 Claims, 5 Drawing Sheets

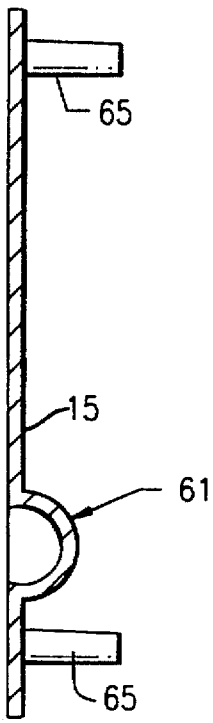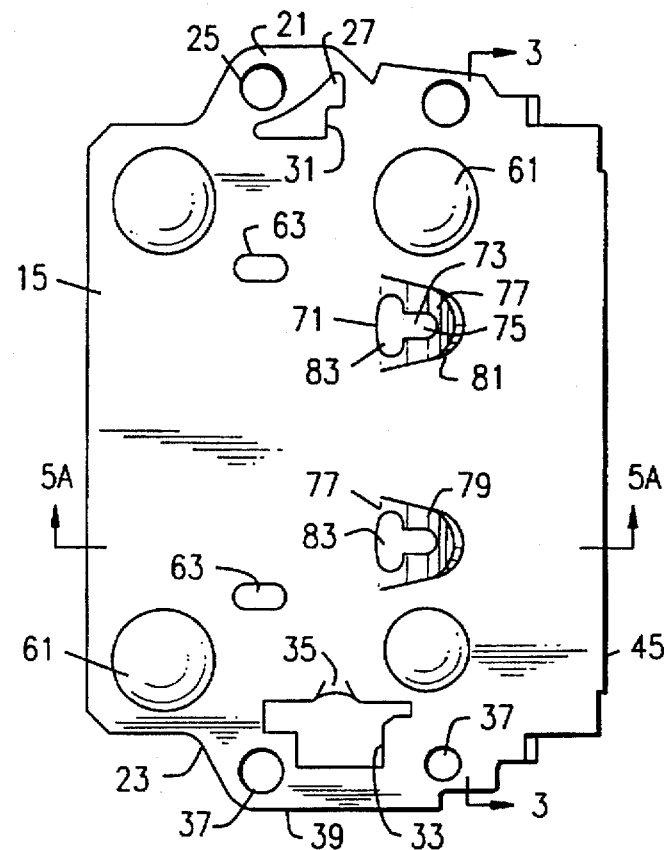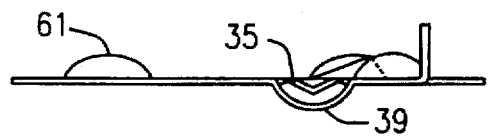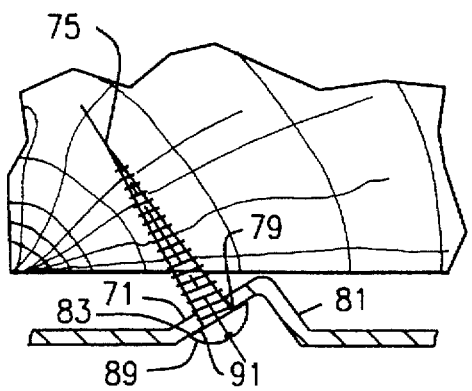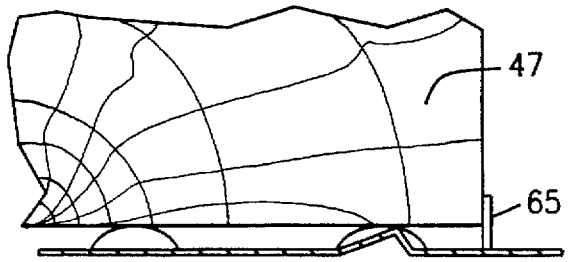
FIG. 3
FIG. 2
FIG. 4
FIG. 5B
FIG. 5A

ELECTRICAL OUTLET BOX

BACKGROUND OF THE INVENTION

This invention is concerned with an electrical, outlet box, and more particularly is concerned with an electrical outlet box, for mounting on a wooden or other stud, or any suitable vertical surface, by means of screws or other suitable fasteners.

FIELD OF THE INVENTION

Electrical outlet boxes of the metallic, knock down type are well known. Commonly, they comprise a U-shaped metal plate forming the top, bottom and rear walls of the box and two, flat metal side plates closing the open sides of the U-shape plate, to form side walls on the box. The side plates are usually connected by way of an interconnecting lug and slot arrangement at one end of each side plate and a screw at the other end. The screw is threaded through a tab of the U-shaped plate and bears against the side plate, to hold it securely in position.

Due at least partially to the provision of these attachment arrangements, the sides of the electrical box can be uneven. To enable the electrical box to be mounted evenly and parallel to a stud, each side plate is commonly provided with a series of bosses, for example, 4 bosses. These levelling bosses are usually part-spherical projections, formed by pressing from each side plate.

To secure the electrical box in position, the side plates are also commonly provided with extensions above and below the box as a whole, i.e. above and below the U-shape plate. These extensions, typically, have a plurality of holes, to enable an electrician to insert nails through the holes and into a stud.

The side plates also are commonly provided with internal slots, for fasting elements. Electricians will often prefer to use these slots, and secure the electrical box by screws inserted through the slots in to the wooden stud. It can be noted that, internally, screws usually have to be used, since it is not possible to hammer a nail that passes through a slot inside the box.

Since these slots are usually spaced some distance from the bosses, if the screws are tightened too much, the side plate can be distorted. In extreme cases this can cause the side plate to disengage from the U-shaped plated forming the body.

A further disadvantage is that the head of the screw protrudes some distance into the interior space of the box and may touch the conductor terminals located on the side of an electrical device, e.g. a switch or outlet socket. This could cause an electrical short, which often is only discovered after the installation is completed. A further possibility is that the screw might simply touch one terminal, rendering the box live, but without causing a short circuit. This renders the box dangerous, and increases the possibility of a subsequent electrical failure, or possible fire.

Accordingly, it is desirable to provide a side plate, for use in electrical outlet boxes, and an electrical outlet box incorporating such an improved side, which eliminates or reduces the problems associated with conventional side plates, as detailed above.

More particularly, it is desirable to provide a side plate and associated electrical box, which is not susceptible to bending or deflection, when the side plate is secured by screws. Further, the side plate ideally provides means for recessing screw heads, at least to a certain extent, so as to largely eliminate the possibility of electrical shorting.

SUMMARY OF THE INVENTION

In accordance with the present invention, there is provided a side plate for forming a side of a metallic knock down, electrical outlet box, the side plate comprising: a generally rectangular planar main body; first and second extensions at first and second ends respectively of the main body; respective attachment means for releasably attaching the first and second extensions to top and bottom walls of a box; and at least one embossed portion on one side of the side plate and an aperture in the embossed portion for receiving a fastening element, for securing a side plate against a mounting surface.

Preferably, the aperture is provided about an axis, with the axis angled toward the front edge of the side plate, on the side opposite from the embossed portion.

More preferably, the embossed portion includes a planar or conical central section, for abutting the head of a screw. The aperture preferably comprises a main portion around the axis for receiving the screw shaft and advantageously an outer portion, for receiving a part of the screw head. The outer portion is located adjacent to the plane of the main body, so as to minimize or reduce protrusion of the screw head above the plane of the main body.

This embossed portion can be provided in addition to conventional bosses for spacing the side plate and electrical box form a stud or other vertical surface. In this case, the embossed portion can have a lesser height then the conventional bosses, all relative to the plane of the side plate. Alternatively, the side plate may have two conventional bosses towards the rear edge, thereof and two embossed portions according to the present invention closer to the front edge thereof. The embossed portion and the bosses would then all be of comparable height relative to the main body.

In accordance with another aspect of the present invention, there is provided an electrical outlet box comprising; top, bottom and rear walls; and a pair of side plates, extending between the top, bottom and rear walls, wherein each side plate in generally planar and has a front edge defining a front, side edge at an open end of the outlet box, and, on each side plate, at least one embossed portion on one side of the plate, which embossed portion includes an aperture for receiving a fastener.

Preferably, the side plate is in accordance with the first aspect of the invention, with the attachment means of the side plate being releasably attached to the top and bottom walls of the body.

DESCRIPTION OF THE DRAWINGS

For a better understanding of the present invention and to show more clearly how it may be carried into effect, reference will now be made, by way of example, to the accompanying drawings, which show preferred embodiments of the present invention:

FIG. 2 is a plan view of a side plate of the electrical box in FIG. 1;

FIG. 3 is a sectional view along line Z—Z of FIG. 2;

FIG. 4 is an end view of the side plate of FIGS. 2 and 3;

FIG. 5A is a sectional view along line XX of FIG. 2, and FIG. 5B is an enlarged sectional view along line XX;

DETAILED DESCRIPTION OF THE PREFERRED EMBODIMENT

Figure 1:
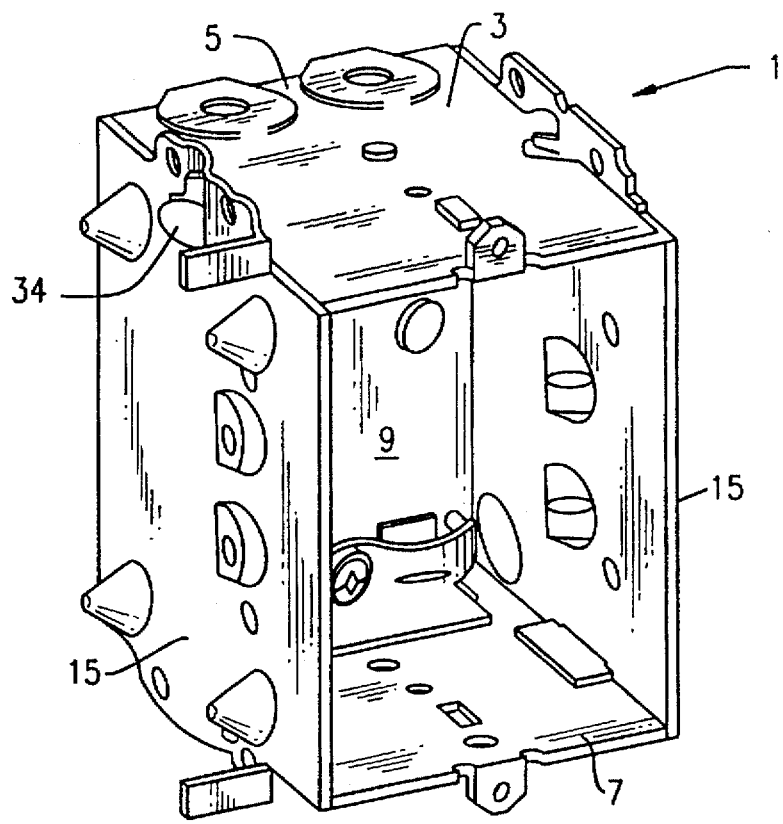
FIG. 1 is a perspective view of a first embodiment of an electrical box in accordance with the present invention.

The first embodiment of the metallic, knock down electrical outlet box 1 of the present invention is shown in FIGS. 1–6. It has a U-shaped plate 3, which forms a top wall 5, a bottom wall 7, and a rear wall 9, of the box. Two generally rectangular side plates 15 are provided, for forming sides of the box to close the box.

Each side plate 15 has a rectangular main body panel 17. As shown, rear corners of the panel 17 are cut back, as indicated at 19.

The side plates 15 have first and second ends 15a and 15b, and are identical to simplify manufacture. Hence, the first end 15a will be the upper end on one side and the lower end on the other side, while the second end 15b will similarly be at the lower end on one side and the upper end on the other side.

At the first end, there is a first extension 21, with a second extension 23 at the second end. In known manner, each of the extensions 21 and 23 includes a pair of holes 25, 37 for receiving nails, to enable it to be nailed to a stud.

In known manner, the connecting means for the first extension 21 includes a generally triangular-shaped opening 27, between the holes 25. The top wall 5 has a locking lug 29, best shown for the bottom wall 7 in FIG. 6, adapted to engage the triangular opening 27, and also an auxiliary projecting tab 31.

In the second extension 23, an approximately T-shaped opening 33 is provided. Adjacent to the opening 33, a conical recess 35 is formed. The holes 37 are provided on either side of opening 33. The lowermost portion 39 of the second extension 23 is curved, as best shown in the view of FIG. 4.

The top and bottom walls 5,7 are each provided with a projecting tab 41 (FIG. 6), recessed slightly from the main plane of the respective wall. Each tab has an opening 43 for a screw. In a known manner, as shown, the tab 41 is inserted through the opening 33, and a screw 34 is inserted through the opening 43 and engages the side face of the plate, at the small recess 35. The curved portion 39 and the configuration of the opening 33 ensure that the head of the screw is not obstructed.

In known manner, each of the top and bottom walls 5, 7 is provided with a locking lug 29 and a projecting tab 41, on opposite sides. Then, each side plate 15 can be first engaged with one locking lug 29 and then with a respective projecting tab 41. A screw is then inserted to secure that side plate 15 in position.

The configuration of the U-shaped plate 3 can be completed in known manner. Thus, the plate 3 can include knockouts 51, to enable cables to access the box where desired. Cable clamps 53 with associated screws can be provided, as well as ground connection screws 55. At the front, upper and lower tabs 57 with threaded bores can be provided for the mounting of an electrical device. The walls of the plate 3 can include holes and bosses, as desired, in a known manner, to enable it to be mounted against a horizontal surface.

It will be realized that the securing arrangement for each side plate 15 results in elements projecting out from the side of the box 1. Accordingly, bosses 61 are provided in each side plate 15, to ensure that the box 1 is uniformly set off from a stud or other vertical surface. Here, four bosses 61 are provided, although the configuration of the bosses can be varied as desired.

Slots 63 are provided in each side plate 15, for insertion of securing screws, and such slots 63 are known. They have the disadvantage that, since they are located between the bosses 61, a screw force applied at this point can distort the side plate 15. In extreme cases, this can cause one or more of the locking arrangements in the first and second extensions 21, 23 to disengage.

In known manner, to locate the box 1 against a wooden stud, tabs 65 are bent from the first and second extensions 21, 23. The tabs 65 are set back from a front edge 45 of each plate 15, so as to recess the box 1 just inside the front surface of conventional drywall.

Now, in accordance with the present invention, embossed portions 77 and apertures 71 for screws are provided. Each aperture 71 can be characterized as having a rounded T-shape. The stem of the T-shape forms a main portion 73 of the aperture, intended to receive the shaft of a screw, and located on axis 75. This axis 75 is generally the center of a respective embossed portion 77. As shown in FIGS. 2 and 5, the embossed portion 77 has a generally planar central section 79, and around this, an arcuate section 81 connecting it to the plane of the side plate 15.

The stem of the T-shape continues onto an outer portion 83, adapted to receive the periphery of the head of a screw, as detailed below.

Figure 6:
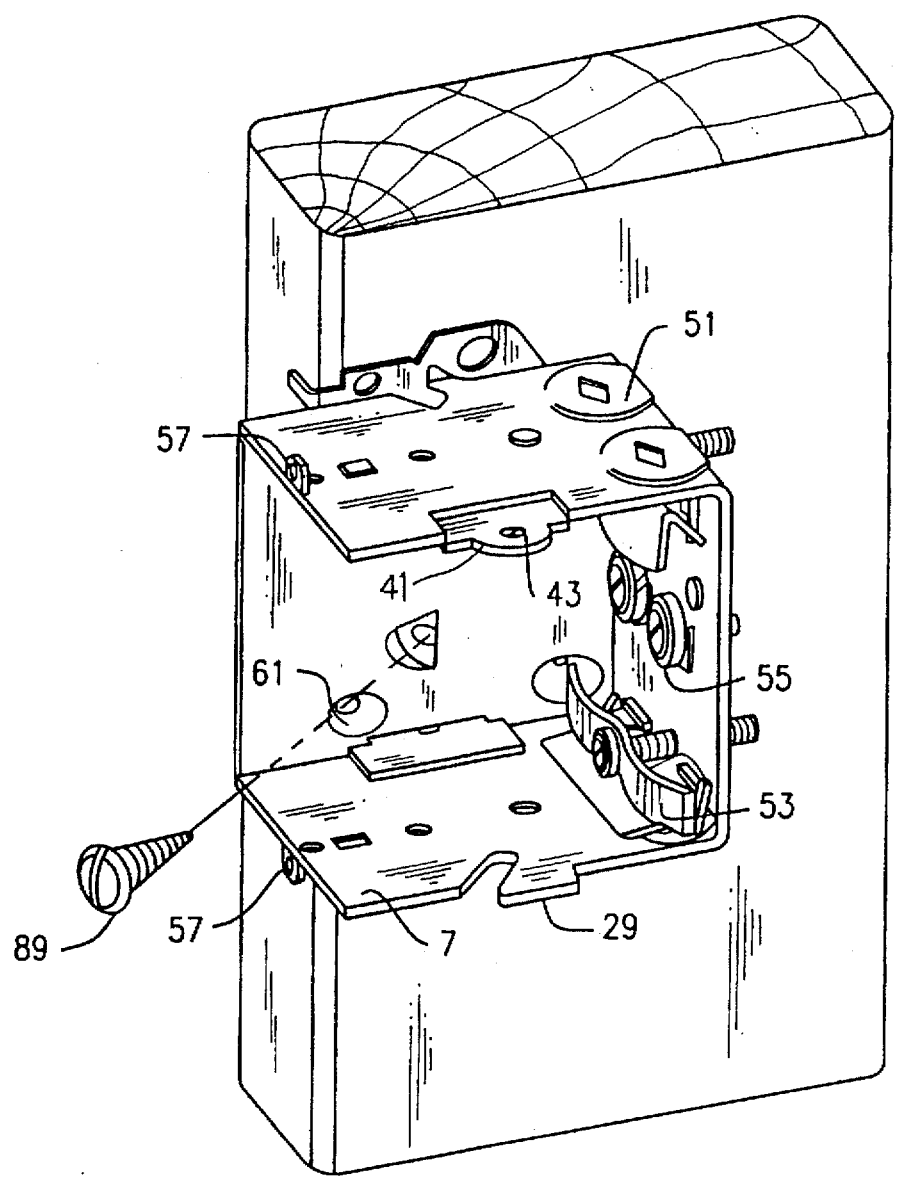
FIG. 6 is a perspective view showing mounting of the electrical box, with one side plate removed.

As FIG. 2 shows, two such embossed portions 77 and apertures 71 are provided, uniformly spaced apart and between the extensions 21, 23. Referring to FIGS. 5 and 6, in use, the box 1 would be located against a stud, indicated at 47, with the tabs 65 abutting the stud in known manner to locate the box 1. The box can indeed be affixed by nails through the holes 25, 37 or screws through the screw slots 63. Here, the box 1 is secured by screws 89 inserted through the apertures 71. The inclination of the planar central section 79, results in the axis 75 being directed at an angle towards the front edge 45 of the side plate and extending through the front opening of the box 1. This means that a screw 89 can be inserted along with axis 75, without any difficulty of the screw being either inclined to a preferred axis, or the installer attempting to insert the screw perpendicular to the side plate 15 within the confines of the box.

FIG. 5B shows that, when the screw 89 is fully inserted, its head abuts the planar central section 79, and an edge portion of the screw head, indicated at 91 is received in the outer portion 83, so that little or no part of the screw had need protrude into the box interior.

This highly desirable, since it leaves the interior of the side plate 15 essentially flush. This facilitates installation of electrical devices of the box, and should virtually eliminate the possibility of unintended short circuits and the like.

A further advantage of having the screw inserted at an angle is that it is at an improved angle, to resist pulling forces on the box 1. Where the screw is inserted perpendicular to the side plate 15, it will resist such pulling forces solely in shear. With the screw angle as shown, it will resist pulling forces, attempting to pull the box forward, both in shear and in tension.

Figure 7:
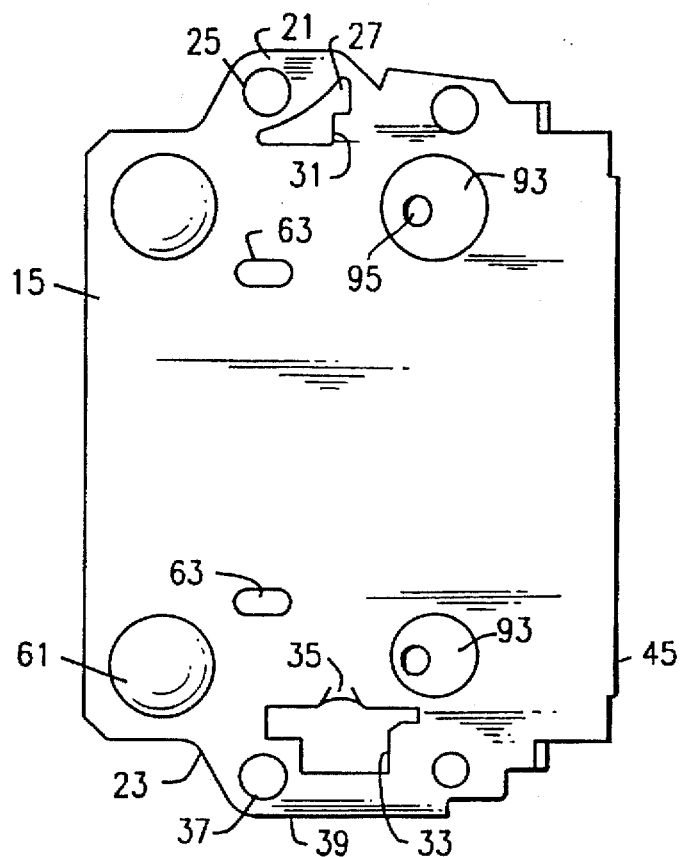
FIG. 7 shows a plan view of a second embodiment of the side plate.
Figure 8:
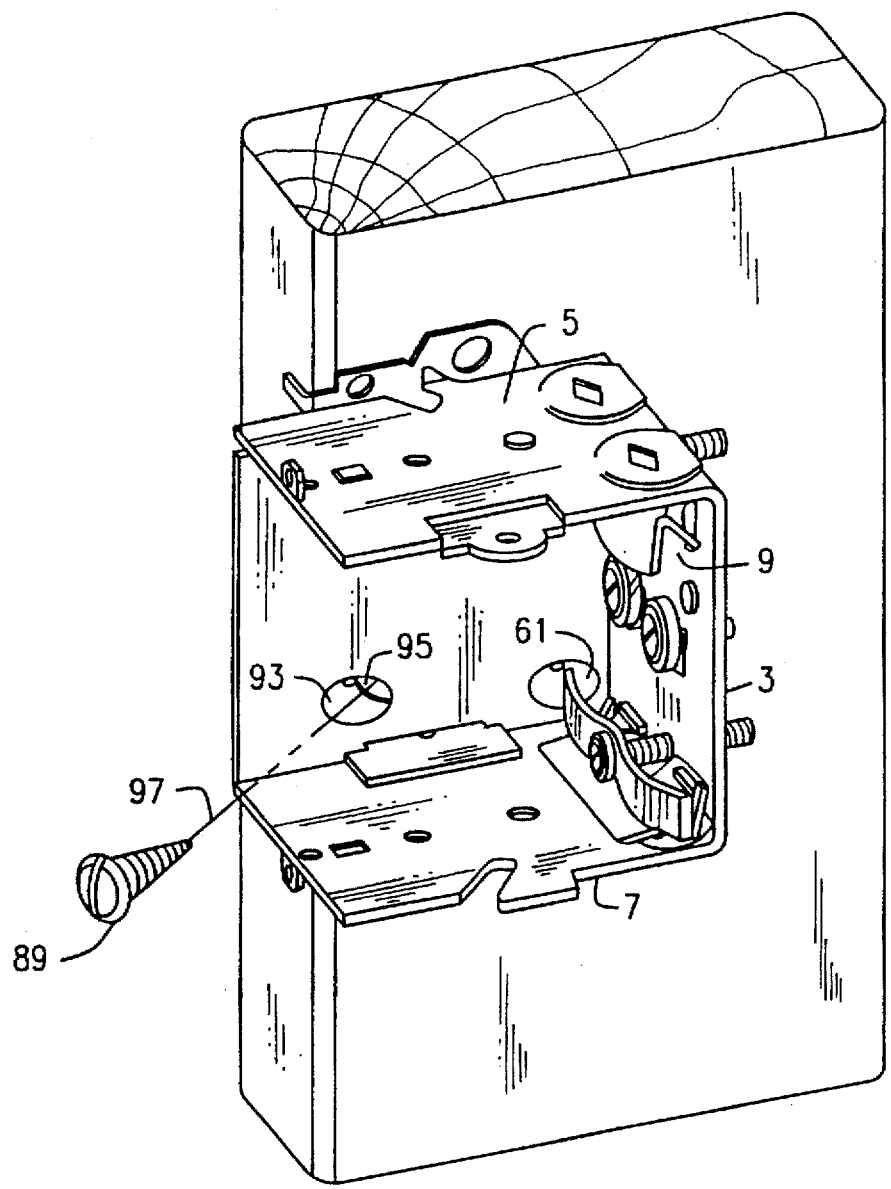
FIG. 8 shows a perspective view, similar to FIG. 6 of an electrical box incorporating the second embodiment of the side plate.

Reference will now be made to FIGS. 7 and 8, which show a second embodiment of the present invention. For simplicity and brevity, like components are given the same reference numerals, and a description or these components is not repeated.

Whereas in the first embodiment, conventional, plain bosses were provided, in the second embodiment, only 2 such bosses 61 are provided, towards the rear of each plate 15. Towards the front edge of each side plate 15, there are two aperture bosses 93, replacing the forward bosses 61. However, as shown, each boss 93 has a circular aperture 95, for receiving a screw. The circular aperture 95 is provided in the side wall as shown, so as effectively to provide an axis 97, inclined like the axis 75.

Then, in use, as shown in FIG. 8, screws 89 can be inserted as before, at an angle, to secure the box in position.

In both embodiments, the fact that the screws are inserted either through the embossed portion 77 or the aperture boss 93, results in the clamping force from the screw being applied directly at the boss. Where conventional screw slots 63 are used, as these are located between the bosses 61, they can result in distortion of the side plate 15. There, no such distortion can occur, and the screws 89 can apply a considerable clamping force to secure the box the box 1 firmly, without any significant distortion occurring.

While the two embodiments are configured for use with screws have planar heads, they could equally be configured for use with countersunk screw heads. Thus, the central portion 79 in the first embodiment, or the surface around the aperture 95 in the second embodiment, could be conical to abut and hold a countersunk screw head.

It will be appreciated that, while preferred embodiments of the invention have been shown and described, numerous variations are possible within the scope of the present invention. In particular, while the invention has been described in relation to a box for a single electrical device, the plate 3 could be exchanged for a variety of plates, to provide boxes for accommodating 2 or more different devices in known manner.

I claim:

1. A side plate, for forming a side of a metallic knock down, electrical outlet box, the side plate comprising: a generally rectangular planar main body; first and second extensions at first and second ends respectively of the main body; respective attachment means for releasably attaching the first and second extensions to top and bottom walls of said box; and at least one outwardly embossed portion on one side of the main body and an aperture in the embossed portion through the one side of the main body for receiving a fastening element, for securing said side plate against a mounting surface.

2. A side plate as claimed in claim 1, wherein the aperture of each said embossed portion is located around an axis which is inclined at an angle to the main body of the side plate, wherein the main body has a front edge extending between the first and second extensions, for forming a front edge of said electrical outlet box, wherein the axis of each said embossed portion is inclined towards the front edge on an other side of the main body.

3. A side plate as claimed in claim 2, wherein each said embossed portion includes a planar central section, with the axis located centrally in and generally perpendicular to the planar central section.

4. A side plate as claimed in claim 3, wherein each said aperture is generally T-shaped and comprises a main portion located around the axis for receiving a shaft of said fastening element, and an outer portion located close to the main body, for receiving part of a head of said fastening element, to substantially eliminate protrusion of said head beyond the main body.

5. A side plate as claimed in claim 3, wherein each said embossed portion includes an arcuate section around the planar central section.

6. A side plate as claimed in claim 2, which includes a plurality of additional bosses projecting on said one side of the side plate, with the additional bosses and each said embossed portion having a substantially similar height relative to the main body and arranged to provide an uniform support to the main body.

7. A side plate as claimed in claim 6, which includes two said embossed portions and two said additional bosses, arranged in a quadrilateral grid, with the embossed portions located closest to the front edge of the side plate.

8. A side plate as claimed in claim 6, which includes four said additional bosses, two of which are located closest a rear edge of the side plate and two which are closest to the front edge of the side plate and wherein there are two said embossed portions, which are substantially equal in distance from the front edge of the side plate, and which are located between the two additional bosses closest the front edge.

9. A side plate as claimed in claim 8, wherein the embossed portions have a height less than the height of the additional bosses all relative to the side plate.

10. A side plate as claimed in claim 7, which includes at least one hole in each of the first and second extensions for receiving a nail or other fastener.

11. A side plate as claimed in claim 7, wherein the first extension includes a triangular opening, for receiving a locking lug, and wherein the second extension has an opening adapted to receive a projecting tab of a wall, for attachment by a screw.

12. An electrical outlet box comprising: top, bottom and rear walls; and a pair of side plates, extending between the top, bottom and rear walls, wherein each said side plate is generally planar and has a front edge at an open end of the outlet box, and at least one outwardly embossed portion projecting from each of said side plates, which said embossed portion includes an aperture through one of the side plates for receiving a fastener.

13. An outlet box as claimed in claim 12, wherein the top, bottom and rear walls are formed by a single plate, wherein the top and bottom walls include respective attachment means, and wherein each of the side plates comprises a generally rectangular, planar main body and first and second extensions at either end of the main body, each of extensions includes an attachment means releasably attached to said respective attachment means of one of the top and bottom walls.

14. An outlet box as claimed in claim 13, wherein the aperture of each said embossed portion is located around an axis which is inclined in an angle to the main body of a respective one of said side plates, wherein the axis of each said embossed portion is inclined towards the front edge of a respective one of said side plates on the main body thereof.

15. An outlet box as claimed in claim 14, wherein each said embossed portion includes a planar central section, with a respective aperture located centrally in the planar central section, and with the axis generally perpendicular to the planar central section.

16. An outlet box as claimed in claim 15, wherein each said aperture is generally T-shaped and comprises a main portion located around the axis for receiving a shaft of a fastener, and an outer portion located close to the main body, for receiving part of a head of said fastener, to reduce protrusion of said fastener beyond the plane of the main body.

17. An outlet box as claimed in claim 15, wherein each said embossed portion includes an arcuate section around the planar central section.

18. An outlet box as claimed in claim 14, wherein each aid side plate includes a plurality of additional bosses projecting on a one side of the side plate, with the additional bosses and each said embossed portion having a substantially similar height relative to the main body and arranged to provide an uniform support to the outlet box.

19. An outlet box, as claimed in claim 18, wherein each said side plate includes two said embossed portions and two said additional bosses, arranged in a quadrilateral grid, with the embossed portions located closest to the front edge of the side plate.

20. An outlet box, as claimed in claim 19, wherein each side plate includes four of said additional bosses, two of which are closest to the front edge of the side plate, and wherein, for each said side plate, there are two of said embossed portions, which are substantially equal in distance from the front edge of the side plate, and which are located between the two additional bosses closest the front edge.

21. An outlet box as claimed in claim 19, wherein, for each said side plate, the embossed portions have a height less than the height of the additional bosses all relative to the side plate.

22. An outlet box as claimed in claim 19, which includes at least one hole in each of the first and second extensions of each said side plate.

23. An electrical outlet box comprising:

a plurality of walls defining a box interior and an open end;

one of said walls including an exteriorly projecting portion;

said portion having an aperture therein extending through said one wall for passage of a fastener from said box interior.

24. An electrical outlet box of claim 23, wherein said projecting portion includes a generally planar section including said aperture thereby and an arcuate section.

25. An electrical outlet box of claim 24, wherein said arcuate section connects said planar section to said one wall.

26. An electrical outlet box of claim 24, wherein said planar section is inclined with respect to said one wall.

27. An electrical outlet box of claim 26 wherein said aperture through said planar section defines a fastener insertion axis through a center of the aperture, said axis being directed towards said open end of said box.

28. An electrical outlet box of claim 24, wherein said projecting portion defines a receiving portion for accommodating a head of said fastener with substantially no portion of said head protruding into said box interior.

29. An electrical outlet box of claim 24 wherein said wall includes an additional projecting portion.

* * * * *